Figure 1:
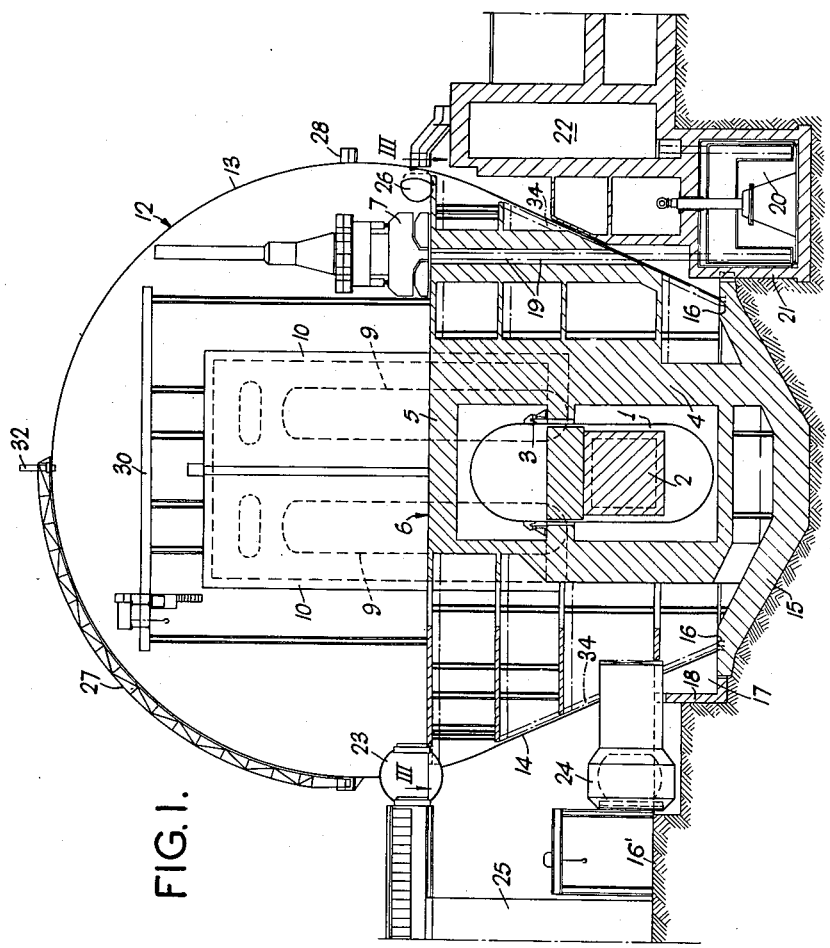

FIG.I.

INVENTORS
GORDON BROWN
NORMAN THOMAS BARRETT 3,234,102
NUCLEAR REACTOR INSTALLATION WITH
IMPROVED CONTAINMENT HOUSING
Gordon Brown, Wigan, and Norman Thomas Barrett, Culcheth, near Warrington, England, assignors to United Kingdom Atomic Energy Authority, London, England
Filed Aug. 11, 1959, Ser. No. 832,959
Claims priority, application Great Britain, Aug. 15, 1958, 26,282/58
1 Claim. (Cl. 176—60)

This invention relates to nuclear reactor installations and has one application to an installation of the kind comprising a nuclear reactor cooled by gas under pressure circulating in a closed circuit through a pressure vessel containing the reactor core and via coolant ducts through one or more heat exchangers.

Cylindrical containments have also been employed for reactors which have either now been completed or are still under construction, for example, the Experimental Boiling Water Reactor (EBWR), the Experimental Breeder Reactor (EBR-2), the Enrico Fermi Fast Breeder Reactor, and the Dounreay Materials Testing Reactors (DMTR). Whilst generally satisfactory, this form of outer housing resulted in uneconomical utilization of space at the lower end thereof or necessitated the reactor pressure vessel being sunk into the ground to a considerable extent.

The present invention provides an improved outer housing aimed at satisfying various requirements, including maximum dimension at the charge face level to allow maximum travel of the refuelling machine, and maximum height from the charge face level firstly for accommodation within the outer housing of the heat exchangers (which are themselves tall) at a substantial height above the reactor so as to provide for natural flow of coolant by convection in case of coolant circulator failure, secondly for accommodation of the refuelling machine which needs to be tall to fulfil its function of removing as a unit a connected train of fuel elements and associated connected neutron shield plug and biological shield plug, and thirdly to accommodate a crane facility for performing various operations at the charge face. The dimension at the bottom of the outer housing, however, needs only to be large enough to contain the reactor pressure vessel, its shielding and the inner housing of shielding material, and this dimension is preferably as small as practicable so that associated appliances and buildings not needing for safety's sake to be within the outer housing, can be sited as near to the reactor as possible for the sake of convenience. At the same time, reasonable economy of material and space, together with practical problems of construction and material, have to be taken into consideration. Furthermore, as one of the functions of the outer housing is intended to be the ability to contain the total volume of coolant in the coolant circuit in the event of a serious breach in the coolant circuit and inner housing, the volume of the outer containment is another factor which has to be taken into consideration.

According to the invention, a nuclear reactor installation has a housing comprising a shell of generally pear-shaped external form, the prolate lower end of the housing being formed by a raft serving to support the housing in or on the ground.

The said raft is preferably of saucerlike form.

Figure 2:
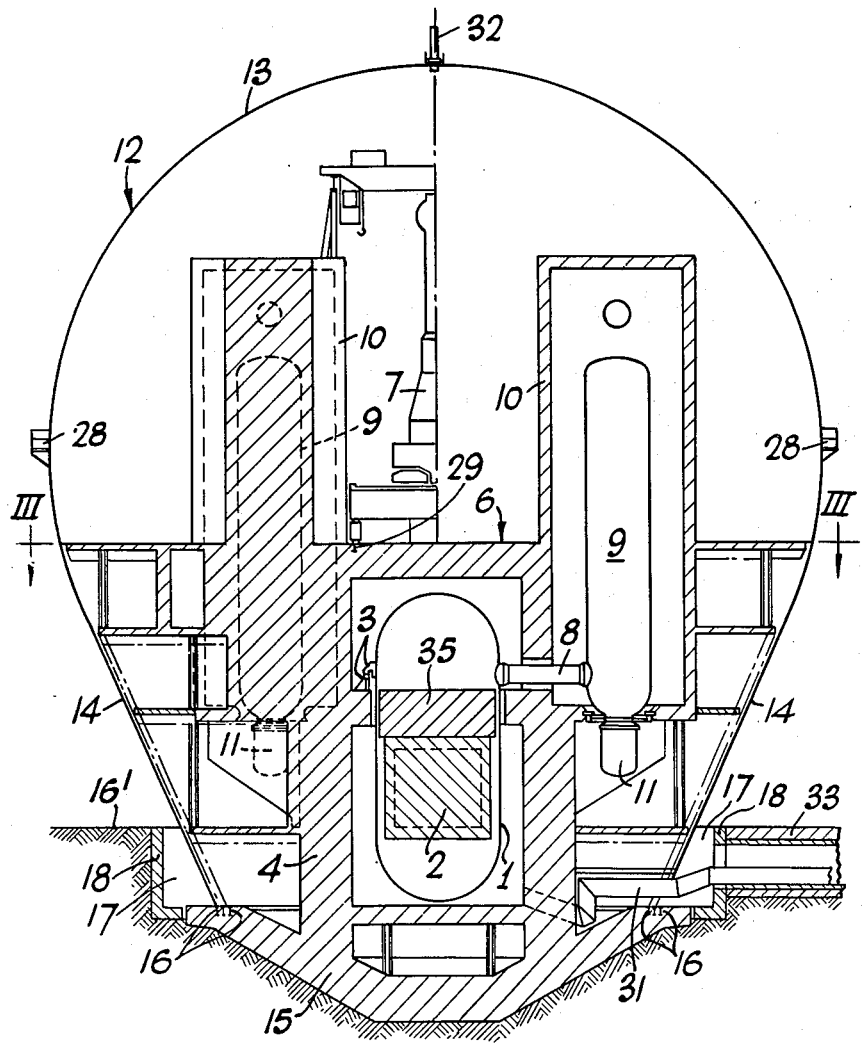
Figure 3:
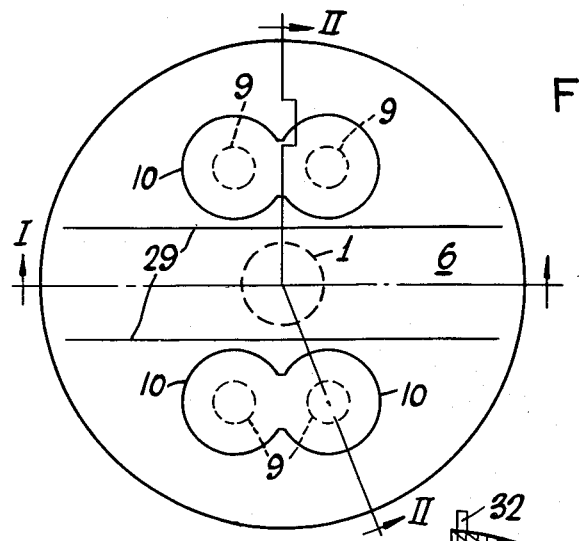
Figure 4:
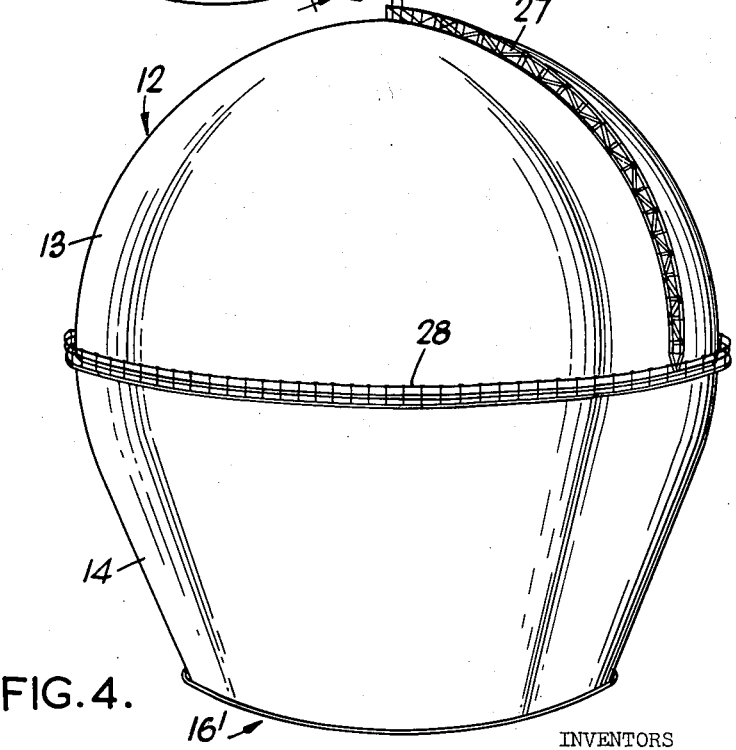

An embodiment of the invention will now be particularly described with reference to the accompanying drawings, wherein FIGURE 1 is a side view in section taken on a line corresponding to line I—I of FIGURE 3, of a nuclear reactor installation, FIGURE 2 is a side view in section taken on a line corresponding to line II—II of FIGURE 3, FIGURE 3 is a detached plan view, drawn to a smaller scale than that of FIGURES 1 and 2, in section on a line corresponding to lines III—III of FIGURES 1 and 2, and FIGURE 4 is a perspective view of a detail.

Referring to the drawings, in the construction of nuclear reactor installation shown therein, the reactor is of the gas-cooled, graphite moderated type and the installation has a pressure vessel 1 containing a graphite moderator core 2 and a neutron shield 35 above the core 2, the pressure vessel 1 being shielded by a massive biological containment 4. The pressure vessel 1 is supported at 3 on a ledge of the containment 4, a top portion 5 of the containment 4 forming a charge face 6 along which a refuelling machine 7 is arranged for travel along rails 29 (see FIGURES 2 and 3). Gaseous coolant, for example carbon dioxide under pressure, is supplied to the pressure vessel 1 via coaxial ducting 8 (see FIGURE 2) and after passing over fuel elements disposed in channels in the core 2 and through channels in the neutron shield 35 passes via the coaxial ducting 8 to four heat exchangers 9 from whence, after exchanging its heat, the coolant is returned to the pressure vessel 1 by circulators 11 associated with the heat exchangers 9. The said fuel elements may be for example as described in U.S. Patent No. 3,128,235. The four heat exchangers are disposed relative to the pressure vessel as shown in FIGURE 3, and each is provided with shielding 10. The shielding 10 and reactor containment 4, together form an inner housing enclosing the reactor pressure vessel and heat exchangers 9 and designed to contain any coolant liberated from its closed circuit in the event of a breach therein, the inner housing being breached only by refuelling branches (not shown) which penetrate the top dome of the pressure vessel 1 and are accessible by the refuelling machine 7 at the charge face 6.

As an additional safety precaution, an outer housing 12 is provided, enclosing the inner housing and also the charge space (including refuelling machine 7) and circulators 11. The outer housing is intended to contain the whole volume of coolant should both the coolant circuit and inner housing become breached as by an explosion, and thereby prevent district hazard. The outer housing 12 is a steel shell whose upper part 13 is of greater than hemispherical external form and whose lower part 14 is matched to the part 13 and is of inverted truncated conical external form. The part 14 is secured to a saucerlike raft 15 of reinforced concrete by bolts embedded therein. The raft 15 has girders 16 serving for load-spreading of floor-carrying columns (indicated in dot-and-dash lines and designated 34) and also carries the whole weight of the assembly within the outer housing 12 through the containment 4, being itself supported by the ground within a pit 17 below normal ground level 16', the pit being lined by a retaining wall 18. The charge face 6 is arranged to be near the horizontal equator of the part 13 of the pear-shaped outer housing 12 so as to provide a maximum amount of travel for the refuelling machine 7, maximum height for the heat exchangers 9 (which are desirably disposed substantially above the pressure vessel 1 so as to allow for a natural convection circulation of coolant in the event of circulator failure) and for the refuelling machine 7 (which has to be tall to carry out its function of charging and discharging a connected train of fuel elements together with connected neutron shield plug and biological shield plug into and out of the reactor) and also for provision of a gantry crane 30 which serves for carrying out various operations at the charge face 6. The part 14 of the outer housing 12 does not need to be of maximum dimension, since it has only to contain the pressure vessel 1 and the containment 4 of the inner housing and its downwardly convergent form allows associated appliances, such as a fuel element storage and transfer facility 20, which do not require to be within the outer housing 12, to be sited near to the reactor. Fuel element transfer tubes 19 pass from the charge face 6 vertically downwardly through the inner housing and through the outer housing 12 to the facility 20, which possesses its own shielding 21 and communicates with an uncoupling cave 22 for inspection, breakdown, etc. It will be appreciated that the construction of the outer housing 12 allows the refuelling machine 7 sufficient travel for it to be able to reach the transfer tubes 19 whilst remaining inside the outer housing 12, as can clearly be seen from FIGURE 1.

Access to the interior of the outer housing 12 can be had through an air lock 23 to the charge face 6 and through a good air lock 24 to the lower levels outside the inner housing, for example to the circulators. The air locks 23, 24 can be reached from a turbine hall 25 and from an adjacent reactor control room (not shown). An emergency air lock 26 is also provided from the charge face 6.

The upper part 13 of the outer housing 12 has at its top a high pressure steam relief valve outlet 32 by means of which steam can be discharged to the atmosphere and not into the charge space. The outlet 32 can be reached by means of a revolvable upwardly extending catwalk 27 reached from a circumferential horizontal catwalk 28 situated on the exterior of the part 13.

A duct 31 from the inner housing communicates with a gas-holder, filters and chemical treatment plant (not shown) situated outside the outer housing 12, the duct 31 extending through the part 14 of the outer housing 12 (see FIGURE 2) and being provided with shielding 33. This enables coolant which may have leaked from the coolant circuit to be removed from the inner housing. Should the inner housing have become breached, the coolant is retained by the outer housing 12 and can be removed to the gas holder through the same duct 31. The duct 31 also serves for blow-down of the coolant circuit when necessary.

We claim:

A nuclear reactor installation comprising a reactor core structure, a series of heat exchangers located at spaced positions around, close to and extending above the reactor core structure, a containment housing for said reactor core structure and heat exchangers, said containment housing having an upper part of part spherical form and a lower part of inverted truncated conical form matched at its upper end to the upper part of the housing and closed at its lower end by a platform resting on the ground on which platform said reactor core structure and heat exchangers are supported.

References Cited by the Examiner
UNITED STATES PATENTS

| | | | |
|---|---|---|---|
| 2,782,158 | 2/1957 | Wheeler | 176—59 |
| 2,810,689 | 10/1957 | Wigner et al. | 176—62 |
| 2,837,477 | 6/1958 | Fermi et al. | 176—58 |
| 2,841,545 | 7/1958 | Zinn | 176—18 |
| 2,879,216 | 3/1959 | Hurwitz et al. | 176—43 |
| 2,892,765 | 6/1959 | Young | 176—33 |
| 2,936,273 | 5/1960 | Untermeyer | 60—108 |
| 2,946,732 | 7/1960 | Wootton | 176—31 |
| 2,983,658 | 5/1961 | Hyman et al. | 176—30 |
| 2,990,354 | 6/1961 | Anderson et al. | 176—37 |
| 2,997,435 | 8/1961 | Millar et al. | 176—59 |

OTHER REFERENCES

Progress Report on Dresden Station: "A Design Description of the Dresden Nuclear Power Station," General Electric Co., publication GER–1301 (1956), pages 7 and 20.

CARL D. QUARFORTH, *Primary Examiner.*

REUBEN EPSTEIN, ROGER L. CAMPBELL, LEON D. ROSDOL, *Examiners.*